INVENTOR
ALBERT C. NOLTE JR.

BY
Nolte & Nolte
ATTORNEYS

United States Patent Office 3,351,935
Patented Nov. 7, 1967

3,351,935
VEHICLE DETECTING SYSTEM AND DUAL PURPOSE MIRROR ARRANGEMENT THEREFOR
Albert C. Nolte, Jr., Oyster Bay Cove, N.Y., assignor to Elton Industries, Inc., New York, N.Y., a corporation of New York
Filed Mar. 29, 1965, Ser. No. 443,583
14 Claims. (Cl. 343—5)

This application is a continuation-in-part of application, Ser. No. 324,379 filed Nov. 18, 1963, now abandoned, by the present inventor.

The present invention relates to a vehicle detector system and more particularly to a system which allows the driver of a vehicle to detect the presence of trailing vehicles, under vision limiting conditions.

Fog shrouded highways have always been, and continue to be a source of great danger for a vehicle traversing highways and byways under this and other vision limiting conditions. It is not uncommon under such conditions for "chain reaction" collisions to occur, where a driver, unaware of closely trailing vehicles, stops or slows down suddenly without giving the trailing vehicle sufficient time to slow down. Another type of accident occurs when a driver is unaware of vehicles which are in the act of overtaking him with the intention of eventually passing him. Thus, it can be understood that the driver who is unaware of a vehicle approaching rapidly from the rear may feel free to move out of his lane into an adjoining lane, or begin a turn. Such a situation often results in disastrous collisions.

Thus, there is a definite need for a means to provide a driver, operating a vehicle under vision limiting conditions, with an awareness of other vehicles approaching from the rear to thereby prevent collisions which often result under such conditions.

It is an object of the present invention, therefore, to provide a system for the detection of trailing vehicles by the driver of a leading vehicle, under vision limiting conditions.

It is still another object of the present invention to provide a system in a vehicle, for the detection of trailing vehicles under vision limiting conditions by utilizing a radar unit in combination with a two-way rear view mirror.

It is yet another object of the present invention to provide a system in a vehicle for the detection of trailing vehicles under vision limiting conditions by utilizing an infra red detection system to detect infra red radiation from trailing vehicles in combination with a display device for displaying the received information in combination with a two way rear view mirror.

It is furthermore an object of the present invention to provide a system in a vehicle for the detection of trailing vehicles by the use of other active and passive electromagnetic detecting devices, including a detection device using a laser beam in the transmitting section, and by displaying the received signal obtained thereby in conjunction with a visual display means in combination with a two-way rear view mirror.

The system presented herein utilizes a two-way mirror which functions as a rear view mirror ordinarily employed by the driver for sighting vehicles or other objects in his rear in clear weather. An electromagnetic signal sensing and display unit is utilized in combination with the two-way mirror and includes switching means allowing the operator to switch the function of the mirror unit from that of an ordinary mirror to a display screen for the display of the returned signals. In a preferred embodiment of this invention a radar unit containing transmitter, receiver and antenna is positioned in the rear of the vehicle with the receiver being tied into a display system located in the two-way mirror. Whichever means is used to detect the trailing vehicles, the driver is able, by the mere flick of a switch to apprise himself of potentially dangerous trailing vehicles of which he would not ordinarily be aware under visual limiting conditions. The invention will be more fully understood and other objects and advantages will become apparent in the following description and accompanying drawings in which FIG. 1 is a sectional view of an automobile using an embodiment of the system of the present invention;

Referring now more in detail to the drawings wherein similar reference numerals identify corresponding parts throughout, 10 represents an automobile and electromagnetic signal detection system, substantially as shown.

Figure 1:
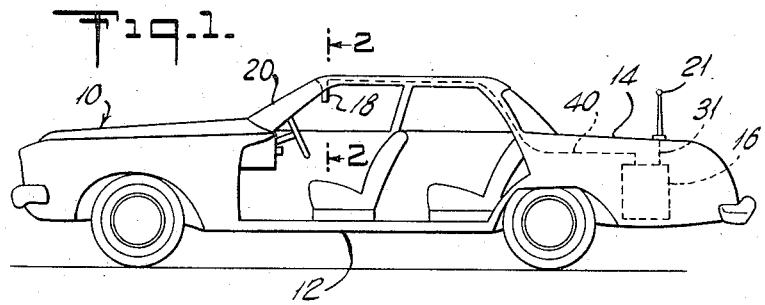

An automobile 12 includes a trunk 14 in position in the rear thereof. Trunk 14 contains both the transmitting and receiving portions of the electromagnetic sensing device 16. Of course, if the device is passive then the sensing device 16 will consist only of a receiver.

Antenna 21 acts as both a receiving and, in the case of an active sensing device, as a transmitting antenna. Conduit 31 electrically connects antenna 21 to sensing device 16. Conduit 40 electrically connects the receiver portion of sensing device 16 to the display unit 34 which is located in display unit 18.

Figure 2:
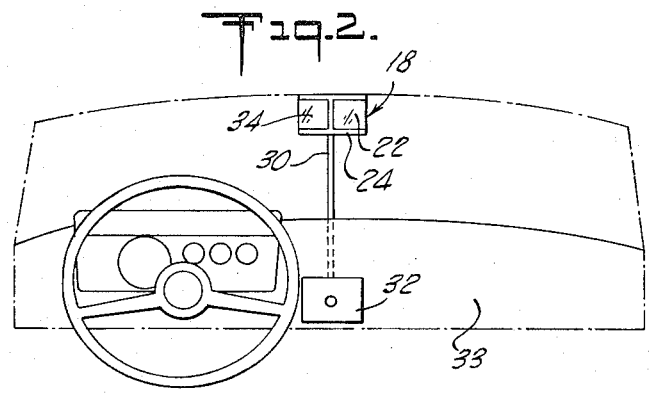
FIG. 2 is a section taken along line 2—2 of FIG. 1.
Figure 3:
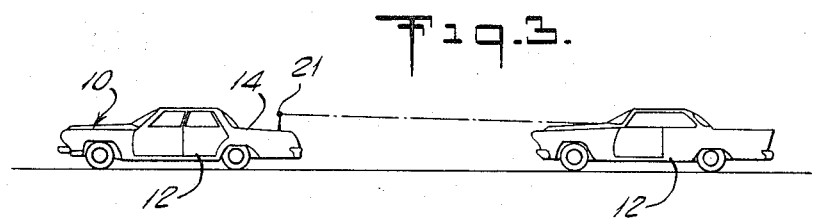
FIG. 3 is a pictorial view showing an automobile employing the system of the present invention on a highway.
Figure 4:
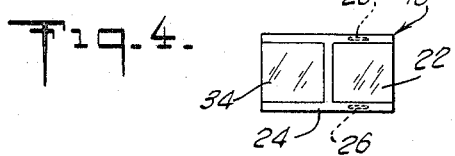
FIG. 4 is an enlarged showing of the mirror unit depicted in FIGS. 1 and 2 and 5.

A rear view mirror display screen unit 18 is positioned above the central portion of front window 20 and is in the position ordinarily occupied by the standard rear view mirror. Mirror unit 18 includes a conventional two-way mirror 22 connected to housing 24 as shown in FIGS. 2 and 4. Light sources 26 are enclosed within housing 24 by any suitable means and are connected to the electrical system (not shown) of the automobile. Light sources 26 are positioned such that when they are actuated the light rays are directed onto the display screen 34 situated within housing 24. Lighting the interior of housing 24 between the mirror and the screen changes the function of the mirror to that of an ordinary transparent pane of glass thereby enabling the driver to see "through" the mirror and view display screen 34.

It will be noted that under certain circumstances the light emitted by the display screen may be sufficient to change the function of the mirror, as above. In that case, light sources 26 may be eliminated. Electrical wire 30 connects light sources 26 to switch 32 of control panel 33 which is adapted to enable the automobile driver to conveniently and simultaneously actuate the light source and electromagnetic detection unit.

Figure 5:
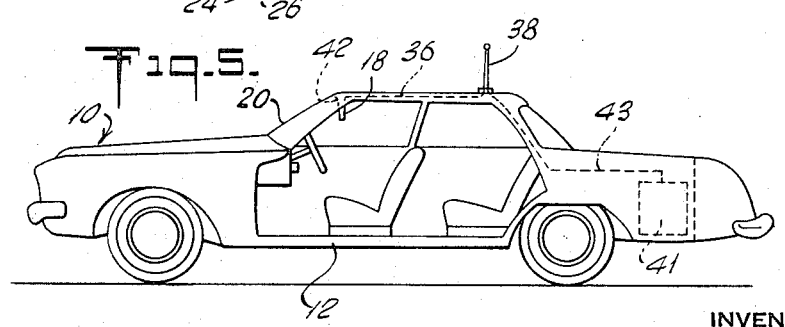
FIG. 5 is a sectional view of another possible embodiment of my invention.

In the embodiment shown in FIG. 5 the radar receiver 42 is positioned in housing 24. In this embodiment, the display unit 34 is positioned within housing 24 and conduit 36 is provided to connect antenna 38 to the receiver 42 located within the display unit 34. Transmitter 41 is connected to antenna 38 by means of conduit 43.

In a passive detection scheme, such as an infra-red detector, transmitter 41 and conduit 43 can be eliminated as there is no need for a transmission of energy.

Under ordinary driving conditions, i.e. the absence of fog, snow, or other vision limiting conditions the electromagnetic sensing unit remains inactive. When the electromagnetic sensing unit is so inactive, the two-way mirror 22 functions as an ordinary rear view mirror. However when fog, snow or other vision limiting conditions arise, the ordinary rear view mirror will not be of any value to the driver. Under certain weather conditions the driver will not be able even to determine the headlights of vehicles following behind and therefore will not become aware of vehicles approaching from the rear until they are very close to his car or have already begun to pass him. This lack of awareness of the position of trailing vehicles, it can be appreciated, places the occupant of both the leading and trailing vehicles in a precarious situation. Under vision limiting conditions the driver may, with the aid of the present invention, discern a vehicle travelling behind him, thereby obviating the dangerous driving situations noted above. By actuating switch 32 of control panel 33 the driver simultaneously activates the electromagnetic sensing units and the light source. The function of the two-way mirror is thus changed from that of an ordinary mirror to that of a transparent viewing glass. The driver may then observe the signal displayed on the display screen indicating the absence or presence of any trailing vehicles and their position relative to the driver's automobile. When the fog lifts or the vision limiting conditions dissipate the driver merely moves switch 32 to the "off" position and mirror 22 which had become transparent reverts to its function as a common mirror which the driver may utilize in the customary manner. While various embodiments of the invention have been shown and described in detail, to illustrate the application of the inventive principles, it should be understood that the invention may be embodied otherwise without departing from such principles.

What I claim is:

1. A vehicle detecting system, comprising
   a vehicle;
   a dual purpose mirror arrangement mounted in said vehicle and having a dark condition in which it provides a reflecting mirror surface and a light condition in which it produces light;
   detecting means carried by said vehicle for detecting the presence of an object in the vicinity of said vehicle; and
   coupling means for selectively coupling said detecting means to said dual purpose mirror arrangement for controlling the condition thereof.

2. A vehicle detecting system as claimed in claim 1, wherein said detecting means switches said dual purpose mirror arrangement to its light condition when said detecting means detects an object in the vicinity of said vehicle.

3. A vehicle detecting system as claimed in claim 1, wherein said detecting means comprises radar transceiver means.

4. A vehicle detecting system as claimed in claim 1, wherein said detecting means comprises infrared detecting means.

5. A vehicle detecting system as claimed in claim 1, wherein said dual purpose mirror arrangement comprises a transparent glass plate and opaque visual indicating means having a face adjacent said glass plate, said visual indicating means having a dark condition in which it provides a reflecting surface for reflecting light passing through said glass plate and a light condition in which it produces light for transmission through said glass plate.

6. A vehicle detecting system as claimed in claim 1, wherein said dual purpose mirror arrangement comprises a transparent glass plate, opaque indicating means having a face adjacent said glass plate, said indicating means providing a reflecting surface for reflecting light passing through said glass plate and having a dark condition and a light condition visually different from said dark condition when illuminated and illuminating means for illuminating the face of said opaque indicating means to visually indicate the condition thereof.

7. A vehicle detecting system as claimed in claim 6, wherein said detecting means is coupled to the illuminating means of said dual purpose mirror arrangement for illuminating the face of said opaque indicating means when said detecting means detects the presence of an object in the vicinity of said vehicle.

8. A vehicle detecting system, comprising
   a vehicle operated by an operator;
   a dual purpose mirror arrangement mounted in said vehicle and mounted in said vehicle in view of said operator and having a dark condition in which it provides a rear view reflecting mirror surface and a light condition in which it produces light;
   detecting means carried by said vehicle for detecting the presence of an object in the vicinity of said vehicle; and
   coupling means for selectively coupling said detecting means to said dual purpose mirror arrangement for controlling the condition thereof.

9. A vehicle detecting system as claimed in claim 8, wherein said detecting means comprises radar transceiver means.

10. A vehicle detecting system as claimed in claim 8, wherein said detecting means comprises infrared detecting means.

11. A vehicle detecting system as claimed in claim 8, wherein said dual purpose mirror arrangement comprises a transparent glass plate in view of the operator and opaque visual indicating means having a face adjacent the surface of said glass plate on the other side from said operator, said visual indicating means having a dark condition in which it provides a reflecting surface for reflecting light passing through said glass plate and a light condition in which it produces light for transmission through said glass plate in view of said operator.

12. A vehicle detecting system as claimed in claim 8, wherein said dual purpose mirror arrangement comprises a transparent glass plate in view of the operator, opaque indicating means having a face adjacent the surface of said glass plate on the other side from said operator, said indicating means providing a reflecting surface for reflecting light passing through said glass plate and having a dark condition and a light condition visually different from said dark condition when illuminated and illuminating means for illuminating the face of said opaque indicator means to visually indicate to said operator the condition thereof.

13. A vehicle detecting system as claimed in claim 12, wherein said detecting means is coupled to the illuminating means of said dual purpose mirror arrangement for illuminating the face of said opaque indicating means when said detecting means detects the presence of an object in the vicinity of said vehicle.

14. A vehicle detecting system as claimed in claim 12, further comprising switch means connected to said illuminating means for manual operation of said illuminating means by said operator.

References Cited

UNITED STATES PATENTS 2,852,974  9/1958  Nobles.
2,998,481  8/1961  Forman.

RODNEY D. BENNETT, *Primary Examiner.*

C. L. WHITHAM, *Assistant Examiners.*